United States Patent
Vasu et al.

(10) Patent No.: US 11,619,249 B2
(45) Date of Patent: Apr. 4, 2023

(54) VEHICLE DRIVELINE COMPONENT HAVING HOUSING ASSEMBLY WITH SLUGS FOR INHIBITING RELATIVE MOVEMENT BETWEEN A HOUSING MEMBER AND A TUBE

(71) Applicant: AMERICAN AXLE & MANUFACTURING, INC., Detroit, MI (US)

(72) Inventors: Anoop Vasu, Rochester Hills, MI (US); Cory J. Padfield, Royal Oak, MI (US); Chih-Hung Chung, Troy, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 17/466,350

(22) Filed: Sep. 3, 2021

(65) Prior Publication Data
US 2023/0073914 A1 Mar. 9, 2023

(51) Int. Cl.
*F16B 5/08* (2006.01)
*B62D 65/02* (2006.01)
*B60B 35/16* (2006.01)

(52) U.S. Cl.
CPC .......... *F16B 5/08* (2013.01); *B62D 65/02* (2013.01); *B60B 35/16* (2013.01); *B60B 2310/302* (2013.01); *B60G 2206/8201* (2013.01)

(58) Field of Classification Search
CPC .......... Y10T 74/2188; B60B 2310/302; B60G 2206/8201
See application file for complete search history.

(56) References Cited

U.S. PATENT DOCUMENTS

| | | | | |
|---|---|---|---|---|
| 1,293,872 A | * | 2/1919 | Murray | B23K 33/004 29/DIG. 48 |
| 3,303,721 A | * | 2/1967 | Puidokas | F16H 57/037 74/607 |
| 3,715,935 A | * | 2/1973 | Ebey | F16H 57/023 301/131 |
| 3,726,154 A | * | 4/1973 | Diessner | B60B 35/16 301/137 |
| 4,189,249 A | * | 2/1980 | Gaines | B62D 7/20 228/178 |
| 5,541,383 A | * | 7/1996 | Renner | B23K 35/0288 219/99 |
| 5,655,418 A | * | 8/1997 | Barnholt | F16H 57/02 403/375 |
| 5,828,028 A | * | 10/1998 | Cecil | B23K 11/0066 219/110 |

(Continued)

*Primary Examiner* — Michael W Hotchkiss
(74) *Attorney, Agent, or Firm* — Reising Ethington, P.C.

(57) ABSTRACT

A vehicle driveline component with a housing, a tube and a plurality of slugs. The housing has a tube mount with a body and a plurality of slug bores. The body defines a tube bore that extends along an axis. The slug bores are spaced circumferentially apart about and are formed through the body. Each of the slug bores intersects the tube bore. The tube is received in the tube bore. Each of the slugs is received into an associated one of the slug bores and is welded to the tube. Each of the slugs engages an inside surface of one of the slug bores to inhibit movement of the tube relative to the tube mount. The body has a wall thickness and each of the slugs engages the inside surface of one of the slug bores over a distance that is less than the wall thickness.

3 Claims, 4 Drawing Sheets

(56) References Cited

U.S. PATENT DOCUMENTS

| | | | | |
|---|---|---|---|---|
| 6,024,418 A * | 2/2000 | Ebert | ................... | B23K 31/02 |
| | | | | 29/402.13 |
| 6,086,162 A * | 7/2000 | Pinch | ................... | B60G 3/145 |
| | | | | 301/124.1 |
| 6,654,995 B1 * | 12/2003 | Wang | ................... | B23K 11/065 |
| | | | | 29/521 |
| 6,817,511 B2 * | 11/2004 | Durand | ................... | B60B 35/16 |
| | | | | 228/115 |
| 6,994,405 B2 * | 2/2006 | Li | ................... | B60B 35/003 |
| | | | | 301/124.1 |
| 7,144,023 B2 * | 12/2006 | Huber | ................... | B60G 7/001 |
| | | | | 280/124.133 |
| 7,377,598 B2 * | 5/2008 | Doud | ................... | B60B 35/003 |
| | | | | 180/378 |
| 7,708,124 B1 * | 5/2010 | Rackers | ................... | B60B 35/16 |
| | | | | 188/250 F |
| 8,939,518 B2 * | 1/2015 | Ebert | ................... | B60B 35/14 |
| | | | | 301/132 |
| 11,198,327 B2 * | 12/2021 | Ebert | ................... | B60B 35/004 |
| 2003/0093888 A1 * | 5/2003 | Prucher | ................... | B60K 17/165 |
| | | | | 29/428 |
| 2005/0051986 A1 * | 3/2005 | Galazin | ................... | B60G 7/001 |
| | | | | 280/124.116 |
| 2008/0095481 A1 * | 4/2008 | Kummings | ................... | B60B 37/10 |
| | | | | 295/44 |

* cited by examiner

VEHICLE DRIVELINE COMPONENT HAVING HOUSING ASSEMBLY WITH SLUGS FOR INHIBITING RELATIVE MOVEMENT BETWEEN A HOUSING MEMBER AND A TUBE

FIELD

The present disclosure relates to a vehicle driveline component having a housing assembly with slugs for inhibiting relative movement between a housing member and a tube. The present disclosure also relates to a method for forming a vehicle driveline component.

BACKGROUND

This section provides background information related to the present disclosure which is not necessarily prior art.

Various types of vehicle driveline components, such as Salisbury-style axle assemblies, employ a housing assembly that includes a housing member and one or more tubes that are inserted into the housing member, typically with an interference fit. Frequently, weld slugs are employed to aid in retaining the tubes to the housing member. Weld slugs are fitted through holes in the housing member and are welded to the outer circumferential surface of the tube. Accordingly, the weld slug is a post-like structure that extends from the tube into a through hole in the housing member.

When a force is applied to a tube that would tend to rotate the tube relative to the housing member, the weld slug is able to contact the housing member to resist rotation of the tube relative to the housing member. In such situations, a bending stress is transmitted to the weld region that secures the weld slug to the tube. The weld between the weld slug and the tube may fail in situations where the bending stresses that are applied to the weld region are sufficiently high. While conventional housing assemblies having weld slugs for securing a tube to a housing member are satisfactory for their intended use, such assemblies are nevertheless susceptible to improvement.

SUMMARY

This section provides a general summary of the disclosure, and is not a comprehensive disclosure of its full scope or all of its features.

In one form, the present disclosure provides a vehicle driveline component that includes a housing member, a tube and a plurality of slugs. The housing member has a tube mount with a tubular body and a plurality of slug bores. The tubular body defines a tube bore that extends along an axis. The slug bores are spaced circumferentially apart about the tubular body and are formed through the tubular body. Each of the slug bores intersects the tube bore. The tube is received in the tube bore. Each of the slugs is received into an associated one of the slug bores and is welded to the tube to inhibit movement of the tube relative to the tube mount. In a location proximate one of the slug bores, the tubular body has a wall thickness taken radially through the tubular body in a direction perpendicular to the axis. Each of the slugs engages the inside surface of the associated one of the slug bores over a distance that is less than the wall thickness. Optionally, each of the slugs may engage an inside surface of one of the slug bores.

In another form, the present disclosure provides a method for forming a vehicle driveline component. The method includes: providing a housing member having a tube mount with a tubular body and a plurality of slug bores, the tubular body defining a tube bore that extends along an axis, the slug bores being spaced circumferentially apart about the tubular body and being formed through the tubular body, each of the slug bores intersecting the tube bore; inserting a tube into the tube bore; providing a plurality of slugs; inserting each of the slugs into a respective one of the slug bores; and welding the slugs to the tube; wherein each of the slugs is sized and/or shaped to permit transmission of force between the slugs and the housing member is over a distance that is shorter than a wall thickness of the tubular body in a location where the slug bores are formed through the tubular body.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
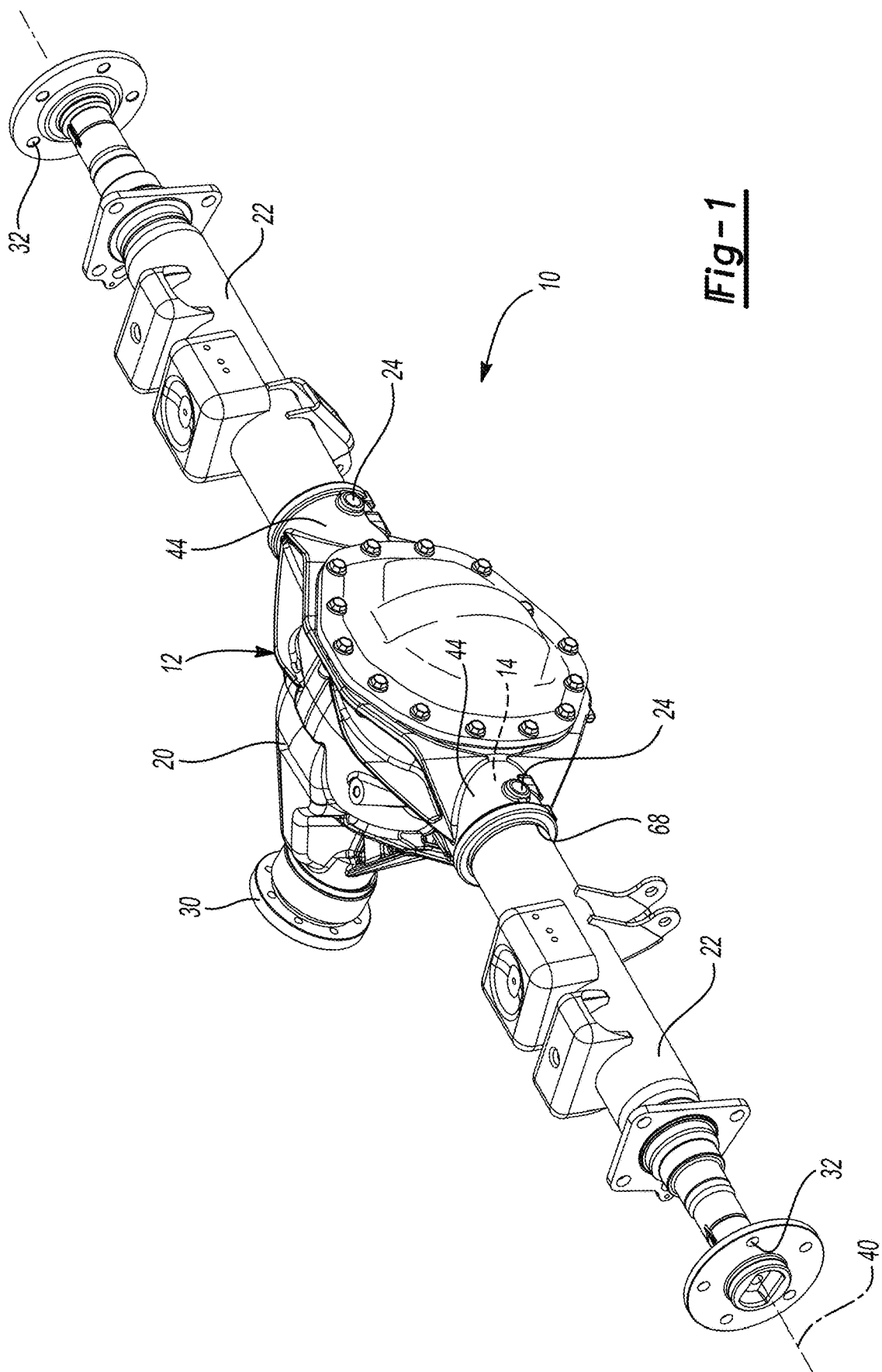
FIG. 1 is a rear perspective view of an exemplary vehicle driveline component constructed in accordance with the teachings of the present disclosure.

With reference to FIG. 1, a vehicle driveline component constructed in accordance with the teachings of the present disclosure is generally indicated by reference numeral 10. The vehicle driveline component 10 can be any type of vehicle driveline component that is configured to transmit rotary power between a source of propulsive power, such as an internal combustion engine or an electric motor, and a set of vehicle wheels. In the particular example provided, the vehicle driveline component 10 is an axle assembly that is configured to receive rotary power from a propshaft (not shown) and to transmit rotary power to a pair of vehicle wheels (not shown).

Figure 2:
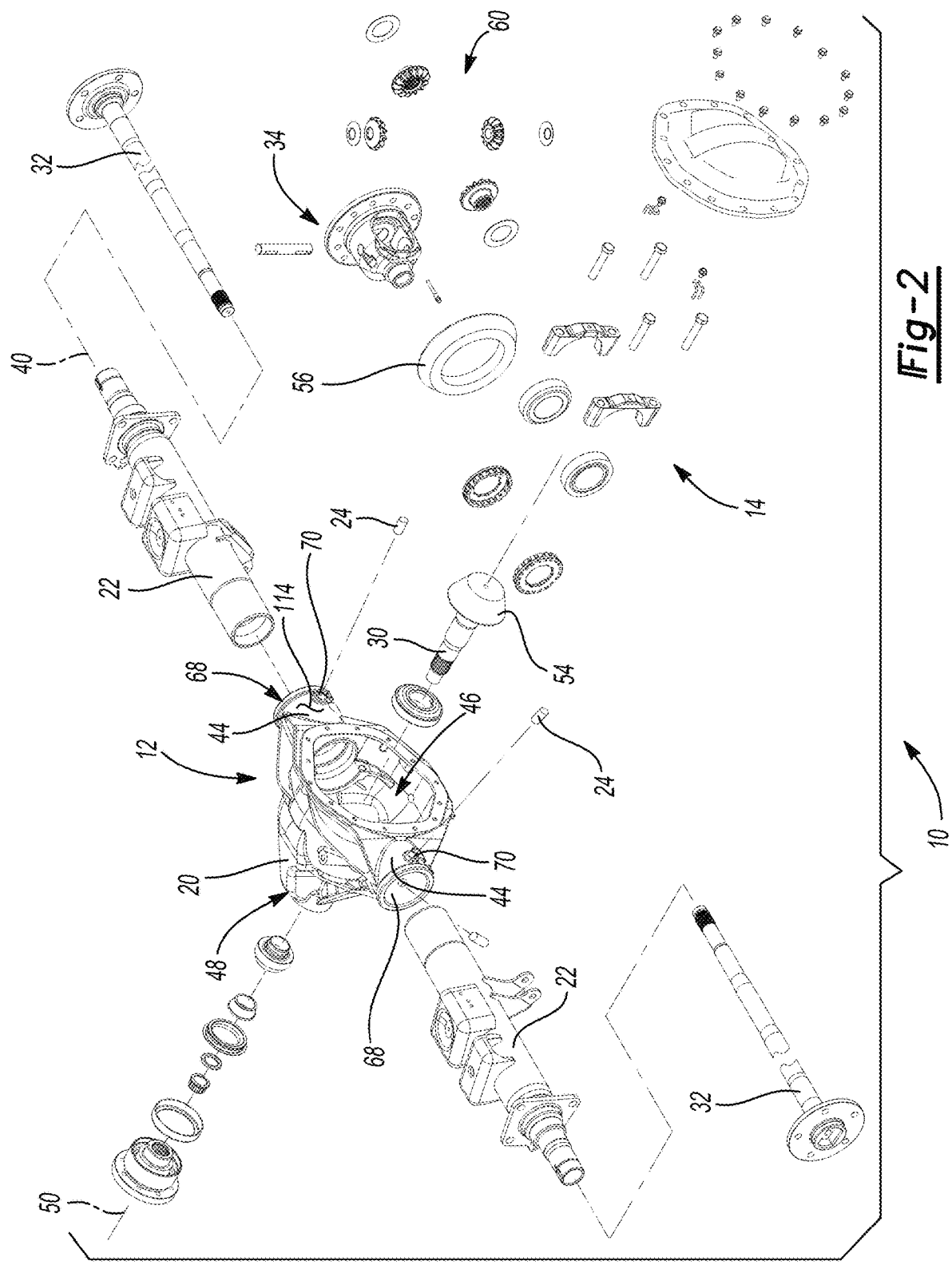
FIG. 2 is an exploded perspective view of the vehicle driveline component of FIG. 1.

With reference to FIGS. 1 and 2, the vehicle driveline component 10 includes a housing assembly 12 and a power transmitting device 14 that is housed in the housing assembly 12. The housing assembly 12 can include a housing member 20, a pair of tubes 22 and a plurality of weld slugs 24. The power transmitting device 14 has an input member 30 and one or more output members 32. In the example provided, the power transmitting device 14 includes a conventional differential assembly 34, the input member 30 is a conventional input pinion, and the output members 32 are conventional axle shafts.

Figure 3:
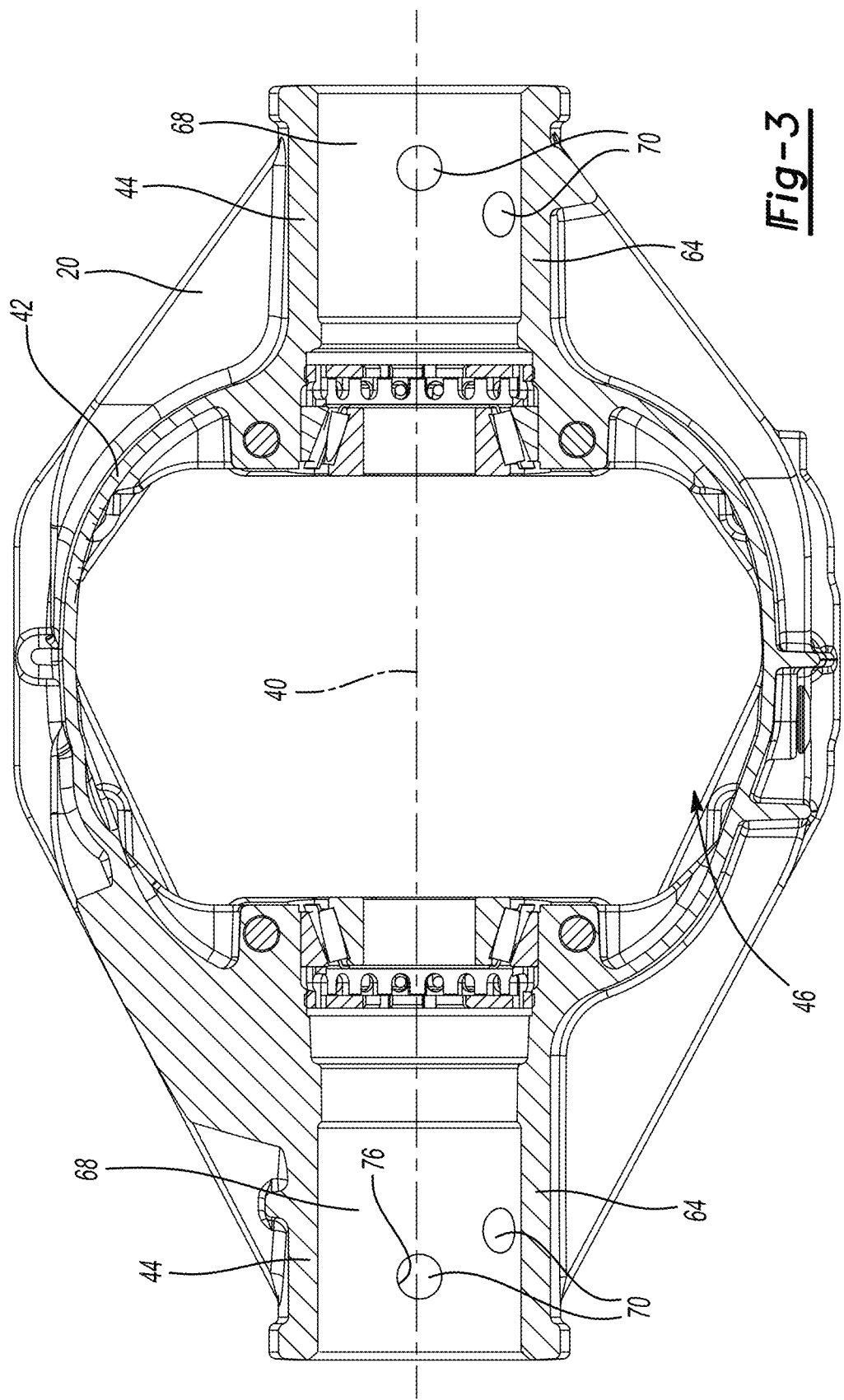
FIG. 3 is a lateral section view of a portion of the vehicle driveline component of FIG. 1, the view illustrating the configuration of a housing member.

With reference to FIGS. 2 and 3, the housing member 20 defines an output axis 40 and may have a wall member 42 and a pair of tube mounts 44. The wall member 42 can define a central cavity 46 and an input member bore 48. The central cavity 46 can be disposed about an output axis 40. The input member bore 48 can be disposed about an input axis 50, which can be disposed transverse to the output axis 40, and can intersect the central cavity 46. The differential assembly 34 is received in the central cavity 46 and the housing member 20 supports the differential assembly 34 for rotation about the output axis 40. The input member 30 is received in the input member bore 48. The housing member 20 in conjunction with one or more bearings (not specifically shown) supports the input member 30 for rotation about the input axis 50. Rotary power can be transmitted between the input member 30 and the differential assembly 34 in any desired manner. In the example provided, the input member 30 includes an input pinion 54 that is meshingly engaged with a ring gear 56, and the ring gear 56 is rotationally coupled to a differential input member 30 of the differential assembly 34. In the example provided, the input axis 50 is transverse to output axis 40, but it will be appreciated that the input axis 50 could be oriented differently, such as parallel to the output axis 40.

The differential assembly 34 can employ any desired means, such as differential gearing and/or one or more friction clutches, to permit (and optionally control) relative rotation about the output axis 40 between each of the differential output members 32 and the differential input member 30. In the example provided, the differential input member 30 is a differential case, a differential gearset 60 is received into the differential case and is employed to transmit rotary power through the differential assembly 34, and the differential output members 32 are side gears in the differential gearset 60.

With specific reference to FIG. 3, the tube mounts 44 are disposed on opposite lateral sides of the housing member 20. Each of the tube mounts 44 includes a tubular body 64 that can be unitarily and integrally formed with the wall member 42. Each tubular body 64 defines a tube bore 68 and a plurality of slug bores 70. The tube bore 68 is disposed along the output axis 40 and intersects the central cavity 46. The slug bores 70 are disposed circumferentially about the tubular body 64 and extend radially through the tubular body 64 so as to intersect the tube bore 68.

With reference to FIGS. 1 through 3, each of the tubes 22 is received into the tube bore 68 of an associated one of the tube mounts 44. In the example provided, the outside circumferential surface of each tube 22 is sized in diameter to engage the inside circumferential surface of the tube bore 68 in an interference fit manner, such as a press-fit. Each of the output members 32 is received into a corresponding one of the tubes 22. One or more bearings (not shown) can support each output member 32 for rotation about the output axis 40 relative to the tube 22.

Each of the weld slugs 24 is received into an associated one of the slug bores 70 and is welded to a corresponding one of the tubes 22. The weld slugs 24 can be welded to the tube 22 in any desired manner, such as resistance welding. The weld slugs 24 cooperate to inhibit both axial movement of the tube 22 relative to the housing member 20 and rotational movement of the tube 22 relative to the housing member 20. Optionally, each of the weld slugs 24 may engage an inside surface 76 (FIG. 3) of one of the slug bores 70.

Figure 4:
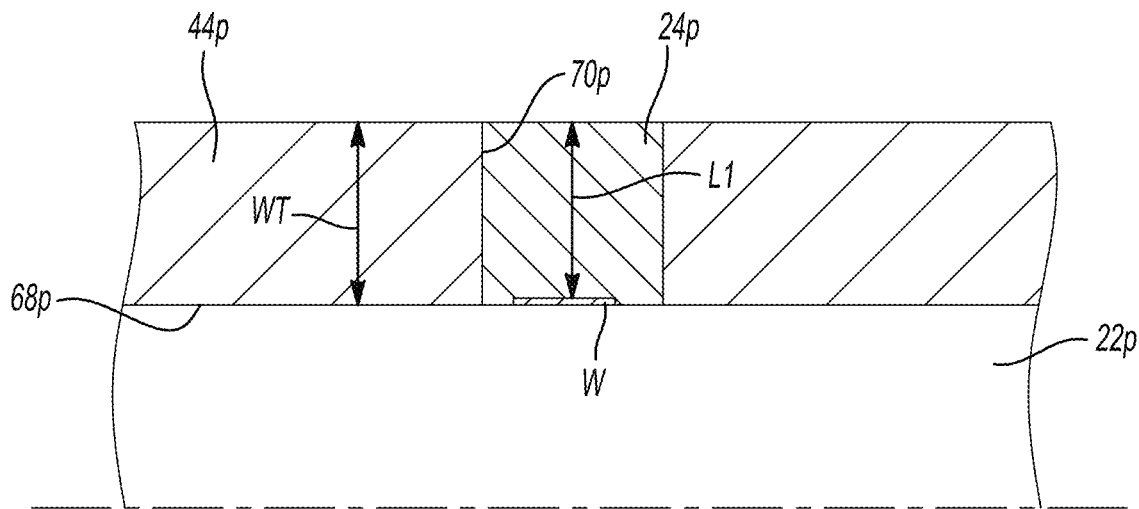
FIG. 4 is a lateral section view of a portion of a housing assembly of a prior art vehicle driveline component illustrating a prior art slug received into a slug bore in a housing member and welded to a tube.

FIG. 4 is a section view of a portion of a prior art housing assembly illustrating a conventional weld slug 24p that is received into a slug bore 70p in a tube mount 44p and welded to a tube 22p. The weld slug 24p is cylindrically shaped, having a diameter that permits it to be fitted through the slug bore 70p without interference and a length L1 that is approximately equal to the wall thickness WT of the tube mount 44p. While configuration in this manner is effective at resisting movement of the tube 22p relative to the tube mount 44p both axially and rotationally, it is possible for relatively high bending stresses to be applied to the weld W that secures the weld slug 24p to the tube 22p when a force of a sufficiently high magnitude is applied to the tube 22p (i.e., a force whose magnitude would be sufficient to overcome the friction of the interference fit between the outer circumferential surface of the tube 22p and the inner circumferential surface of the tube bore 68p in the tube mount 44p to cause axial or rotational movement of the tube 22p relative to the tube mount 44p).

Figure 5:
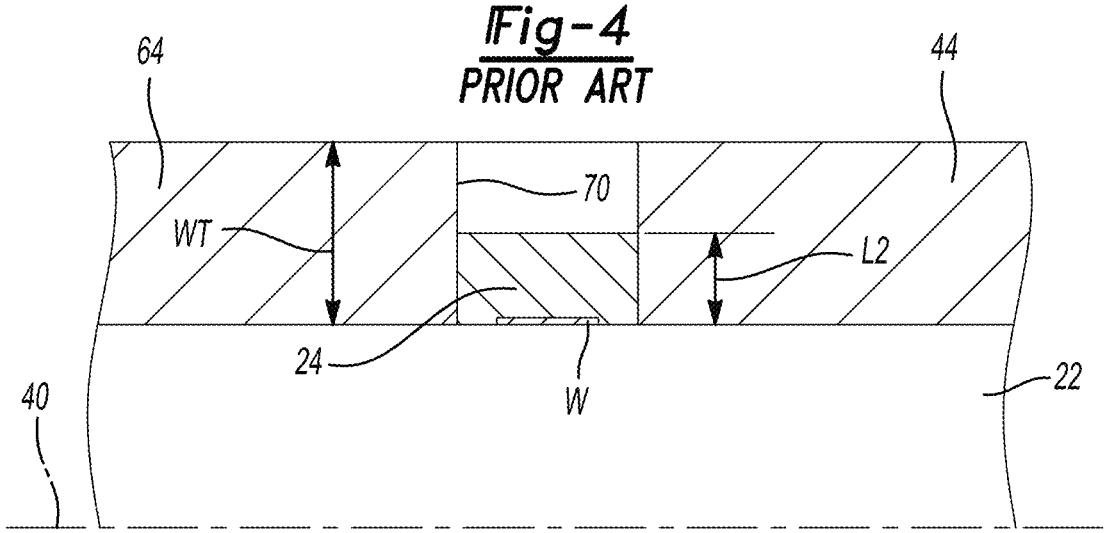
FIG. 5 is a lateral section view similar to that of FIG. 4 but illustrating a portion of a housing assembly of the vehicle driveline component of FIG. 1.
Figure 6:
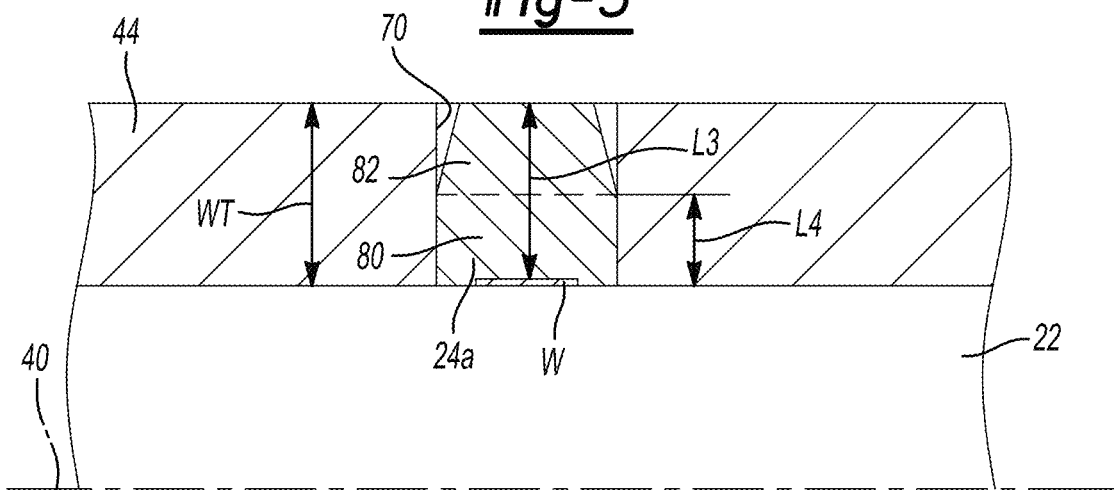
FIG. 6 is a lateral section view similar to that of FIG. 6 but illustrating an alternatively configured slug.

FIGS. 5 and 6 are section views that are similar to FIG. 4 but which illustrate housing assemblies constructed in accordance with the teachings of the present disclosure. In FIG. 4, the weld slug 24 is cylindrically shaped, having a diameter that permits it to be fitted through the slug bore 70 and an overall length L2 that is shorter than the wall thickness WT of the tube mount 44. In the example provided, the diameter of the weld slug 24 permits the weld slug 24 to be fitted through the slug bore 70 without interference, but it will be appreciated that the diameter of the weld slug 24 could be somewhat larger so that the outside circumferential surface of the weld slug 24 contacts the inside circumferential surface of the slug bore 70 as the weld slug 24 is installed to the slug bore 70. Generally speaking, the tubular body 64 has a wall thickness WT in a location proximate one of the slug bores 70. The wall thickness WT dimension is taken radially through the tubular body 64 in a direction perpendicular to the output axis 40 (i.e., the wall thickness WT is the length of the slug bore 70) and the weld slug 24 is configured to engage the inside surface of the slug bore 70 over a distance that is less than the wall thickness WT. In the particular example provided, the overall length L2 is one-half of the wall thickness WT. The shortened length of the weld slug 24 (relative to the prior art shown in FIG. 4) correspondingly shortens the effective length of the lever arm that is provided by the weld slug 24 so that relatively less bending stress is developed (and applied to the weld W) when the tube 22 is exposed to a force of the magnitude described above.

In FIG. 6, the weld slug 24a has an overall length L3 that is greater than or approximately equal to the wall thickness WT of the tube mount 44, but is constructed with at least two distinct portions, such as a first portion 80 and a second portion 82. The first portion 80 is cylindrically shaped, having a diameter that permits it to be fitted through the slug bore 70 without interference, but it will be appreciated that the diameter of the first portion 80 could be somewhat larger so that the outside circumferential surface of the first portion 80 of the weld slug 24a contacts the inside circumferential surface of the slug bore 70 as the weld slug 24a is installed to the slug bore 70. The first portion 80 can have a length L4 that is shorter than the wall thickness WT of the tube mount 44. In the example provided, the length L4 is one-half of the wall thickness WT and also one-half the length L3. The length of the second portion 82 is equal to the overall length L3 of the weld slug 24a minus the length L4 of the first portion 80. Accordingly, the length of the second portion 82 is one-half of the overall length L3 in the example provided. The second portion 82 can be shaped in any desired manner but is smaller in size than the slug bore 70. Additionally, the second portion 82 is sized with a cross-sectional area taken perpendicular to the output axis 40 is smaller than a cross-sectional area of the first portion 80 that is taken perpendicular to the axis. Stated another way, a cross-sectional area of the second portion 82 that is taken perpendicular to a longitudinal axis of the weld slug 24a is smaller than a cross-sectional area of the slug bore 70 as taken perpendicular to the longitudinal axis of the slug bore 70, and is smaller than a cross-sectional area of the first portion 80 as taken perpendicular to the longitudinal axis of the weld slug 24a. If desired, the cross-sectional area of the second portion 82 may optionally be smaller at an end of the second portion 82 that is opposite the first portion 80. In the example provided, the second portion 82 is frusto-conically shaped in a manner that decreases in diameter with increasing distance from the first portion 80. It will be appreciated, however, that the second portion 82 could be shaped differently. For example, the second portion 82 could be shaped as a right cylinder that extends from the first portion 80 and which has a diameter that is smaller than the diameter of the first portion 80. It will be appreciated that formation of the weld slug 24a with a smaller sized second portion 82 works to shorten the effective length of the weld slug 24a (i.e., to the length L4 of the first portion 80) and thereby the effective length of the lever arm that is provided by the weld slug 24a so that relatively less bending stress is developed (and applied to the weld W) when the tube 22 is exposed to a force of the magnitude described above. The longer length L3 of the weld slug 24a relative to the length L2 (FIG. 5) of the weld slug 24 (FIG. 5) can be an advantage in situations where it is desirable that the slug is not recessed into the slug bore 70 when the slug is welded to the tube 22.

Returning to FIGS. 1 through 3, a method for forming a vehicle driveline component is also provided. The method includes: providing a housing member 20 having a tube mount 44 with a tubular body 64 and a plurality of slug bores 70, the tubular body 64 defining a tube bore 68 that extends along an axis (e.g., the output axis 40), the slug bores 70 being spaced circumferentially apart about the tubular body 64 and being formed through the tubular body 64, each of the slug bores 70 intersecting the tube bore 68; inserting a tube 22 into the tube bore 68; providing a plurality of weld slugs 24; inserting each of the weld slugs 24 into a respective one of the slug bores 70; and welding the weld slugs 24 to the tube 22; wherein each of the weld slugs 24 is sized and/or shaped to permit transmission of force between the weld slugs 24 and the housing member 20 is over a distance that is shorter than a wall thickness WT of the tubular body 64 in a location where the slug bores 70 are formed through the tubular body 64.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for forming a vehicle driveline component, the method comprising: providing a housing member having a tube mount with a tubular body and a plurality of slug bores, the tubular body defining a tube bore that extends along an axis, the slug bores being spaced circumferentially apart about the tubular body and being formed through the tubular body, each of the slug bores intersecting the tube bore; inserting a tube into the tube bore; providing a plurality of slugs, each of the slugs having a first portion and a second portion, the first portion having a generally cylindrical shape, the second portion extending directly from the first portion and being smaller in diameter than the first portion; inserting each of the slugs into a respective one of the slug bores such that an axial end of the first portion of each of the slugs abuts the tube; and welding the axial end of each of the slugs to the tube, wherein at least a portion of the second portion of each of the slugs is received within an inside circumferential surface of an associated one of the slug bores and wherein the second portions of the slugs do not contact the inside circumferential surfaces of the slug bores.

2. The method of claim 1, wherein an outside circumferential surface of the tube engages an inside circumferential surface of the tube bore with an interference fit.

3. The method of claim 2, wherein the interference fit is a press-fit.

* * * * *